Patented July 22, 1947

2,424,477

UNITED STATES PATENT OFFICE 2,424,477

PREPARATION OF HALOGEN SUBSTITUTED AMINOARYLSULPHONIC ACID DERIVATIVES

Henry Martin, Basel, Hans Heinrich Zaeslin, Riehen, near Basel, and Rudolf Hirt and Alfred Staub, Basel, Switzerland, assignors to J. R. Geigy A. G., Basel, Switzerland No Drawing. Application February 4, 1943, Serial No. 474,730. In Switzerland December 24, 1938

2 Claims. (Cl. 260—509)

This application is in part a continuation of our application Ser. No. 309,292, filed December 14, 1939, issued August 31, 1943, as Patent No. 2,328,159.

It has been found that new, technically valuable, water soluble compounds are obtained by treatment of monoaminosulphonic acids of the general formula

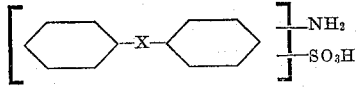

in which X represents a divalent atom, such as O or S, or a divalent atomic group, such as SO, SO$_2$, CH$_2$, CO, NH, NH—CO—NH, with aralkylating agents or alkylating agents containing high molecular alkyl radicals which may be substituted or contain hetero atoms or hetero atom groupings in the alkyl part if necessary in combination with the action of any acylating agent, all these reaction components being so chosen that at least one is halogenated. The halogen can, however, be partly or wholly introduced into the unhalogenated or low halogenated end product. The position of the halogen atom is immaterial.

In general the following aminosulphonic acids are well adapted for this process: the sulphonic acids of aminodiphenylethers, of aminodiphenylsulphides, of aminodiphenylsulphoxides, of aminodiphenylsulphones, of aminodiphenylmethanes, of aminodiphenylketones, of aminodiphenylamines, of aminodiphenylureas, etc. Particularly advantageous is the use of halogen and alkyl substituted derivatives of the above mentioned amino sulphonic acids, such as for example 4,4'-dichloro-2-amino-1,1'-diphenylether-2'-sulphonic acid, 4-chloro-4'-amino-1,1'-diphenylether-2'-sulphonic acid, 2'-4-dichloro-4'-amino-1,1'-diphenylether-2-sulphonic acid, 3-methyl-4-chloro-4'-amino-1,1'-diphenylether-2'-sulphonic acid, 3,4-dichloro-4'-amino-1,1'-diphenylsulphide-4'-sulphonic acid, 4-chloro-4'-amino-1,1'-diphenylsulphoxide-2'-sulphonic acid, 4-chloro-4'-amino-1,1'-diphenylsulphone-2'-sulphonic acid, 4,4'-dichloro-2-amino-1,1'-diphenylmethane-2'-sulphonic acid, 4-chloro-4'-aminodiphenylketone-3-sulphonic acid, 3,4-dichloro-4'-aminodiphenylamine-2'-sulphonic acid, etc. Where the unhalogenated aminosulphonic acid is employed, the condensation product is halogenated by the usual process. This can also be employed with products having only a low halogen content.

Where halogen substituted aminosulphonic acids are to be used, only selected technically obtainable halogenated compounds are available, as listed above, which, as a consequence of their preparation in a pure form, i. e. separation from the isomeric or by-products formed simultaneously during halogenation, are relatively costly. The number of possible components is also decreased by the laws of substitution of the halogen atoms.

The halogneated aminodiphenylether sulphonic acids have proved themselves, among other monoaminosulphonic acids as particularly suitable. They are, for example, obtained by condensation of o- or p-chloronitrobenzene sulphonic acids with halogenophenols and subsequent reduction. The preparation of the halogenated amino-diphenylether sulphonic acids frequently offers certain difficulties, owing to the fact that the manufacture of the intermediate halogenophenols, particularly in the case of the higher substituted halogenophenols, in a pure form is not easy. Thus while pure p-chlorophenol and therefrom the condensation product with halogenonitrobenzenesulphonic acids in a pure form may easily be obtained, on the other hand it is particulary difficult to manufacture a sufficiently pure 2,4-dichlorophenol, as p-chlorophenol and 2,6-dichlorophenol are invariably present in the technical product owing to the difficulties of separation, as their boiling points are very similar.

As these products condense similarly and even easier than the 2,4-dichlorophenol, with halogenonitrobenzene sulphonic acids, so after reduction, is mostly a mixture of halogenated diphenylethers obtained which is not so suitable for a smooth condensation with the mentioned alkylating, aralkylating and acylating agents. Although such mixtures may be suitable for certain technical purposes, for others it is necessary to prefer the homogeneous product. This can be done in part by the halogenation of the already prepared, unhalogenated or only low halogenated amino-arylsulphonic acids prepared according to this invention.

By such halogenation in the usual manners there are, in part, obtained the same aminoarylsulphonic acids as by the use of halogenated components, and, in part, aminoarylsulphonic acids halogenated in other positions, so that by the introduction of different halogens, new, until now technically unobtainable compounds are formed.

For the alkylation, in which only compounds with high molecular alkyl chains are to be used, cannot only the homogeneous alkyl compounds such as the higher alcohols, prepared, for example, by the reduction of the naturally occurring fats, oils, resins, etc., be used, but also those compounds whose alkyl chains are broken by atoms or molecular-groups, or which are substituted. For example the following are named: chloromethyldodecylether, chloro-methyldodecylthioether, α-halogenocarboxylic acids, or their salts, esters or amides, and particularly the halogenated aromatic amides of α-halogenated aliphatic carboxylic acids.

As aralkylating agents are named: benzylhalogenides, especially however such halogen substituted products as 2-chlorobenzylchloride, 4-chloro- or -bromobenzylhalogenides, 3,4-dichlorobenzylchloride, x,x-dichlorobenzylchloride, as obtained by the chlorination of benzyl chloride in presence of iodine, tri- and tetrachlorobenzyl halogenides etc.

These alkyl- or aralkyl derivatives of the aromatic aminosulphonic acids can in given cases be further treated with any aliphatic, araliphatic or aromatic acylating agent.

For the acylation of the above mentioned amino-sulphonic acids containing free amino groups, the aliphatic monocarboxylic acids with at least 7 carbon atoms, or any aliphatic polycarboxylic acid or araliphatic or aromatic mono- or poly-carboxylic acid can be used. Similarly come into consideration suitable aromatic and araliphatic sulphonic acids. Preferably here also the halogenated derivatives of these compounds are to be used. Obviously it is to be understood that all functional derivatives of the previously mentioned acids such as the esters, halogenides etc., where their use in acylation is known, are also included. As examples are mentioned from the aliphatic carboxylic acids: capric acid, lauric acid, myristic acid, palmitic acid, stearic acid etc., and also the naturally occurring cheap, fatty acid mixtures such as fish-oil acid, palm-kernel fatty acid, their derivatives such as α-halogenopalmkernel fatty acid halogenides, etc. From the araliphatic acylating agents are mentioned: phenylacetic acid, 2- or 4-halogenophenylacetic acid, hydrocinnamic acid, phenoxyacetic acid, halogensubstituted phenoxyacetic acids, etc. From the aromatic acylating agents: benzoic acid, 2,4- or 3,4-dichlorobenzoic acid, 3,4-dichlorobenzenesulphonic chloride.

The same or similar products can also be prepared from an aromatic monoamine of the formula

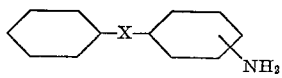

where X has the same definition as before, by treatment with the above mentioned alkylating or aralkylating and perhaps acylating agents, followed by sulphonation to produce the solubility in water.

Through the particular choice of the alkylating, aralkylating and acylating agents or by particular substitution in the aromatic aminosulphonic acids the possibility is given of obtaining products for different technical purposes. So can products be obtained which are especially good for the protection of wool, feathers, furs, hair, paper, textiles, leather, natural and artificial fibres, or materials containing these substances, against moths and other textile damaging insects. The fastness to washing, milling and light of such products is noteworthy. By other substitution, alkylation or aralkylation can be prepared products for use as disinfectants, bactericides, fungicides and insecticides, and also particularly good mercury free seed disinfectants. These compounds possess also good penetrative power, which in conjunction with the low poison effect on humans, makes them especially valuable for technical utilization.

In the instant case, the claims are directed exclusively to the presently-preferred species of the invention, namely, that involving the aralkylation of 4 - amino - 4'-amyl-1,1'-diphenylether-2-sulphonic acid with 2,3,4,6-tetrachlorobenzylchloride.

The following examples illustrate the invention, the parts being by weight where nothing other is said.

*Example 1*

103 parts of nitro-p-chlorobenzylchloride (boiling point 11 mm, 160–170° C.), obtained by nitrating p-chlorobenzylchloride, are stirred with 300 parts by volume of chlorobenzene and 100 parts of aluminium chloride at 25° C. until the evolution of hydrochloric acid is complete. The excess of chlorobenzene is distilled with steam after decomposing the aluminium chloride with ice. The residue is extracted with ether, dried and distilled in a vacuum. The condensation product, probably the 2-nitro-4,4'-dichloro-1,1'-diphenylmethane, has the boiling point 15 mm, 220–230° C.

By reduction with iron the 2-amino-4,4'-dichloro-1,1'-diphenylmethane is obtained, boiling point 15 mm, 220–230° C.; 55 parts of this base are added to 500 parts of sulphuric acid monohydrate and stirred during 2 hours at 90–100° C., then the whole is cooled, poured on ice, the precipiate filtered off, washed with water and dried. The 2-amino-4,4'-dichloro-1,1'-diphenylmethane-2'-sulphonic acid is a white powder with a strongly sweet taste.

17 parts of this diphenylmethanesulphonic acid are dissolved in 100 parts of water and the solution treated with 30 parts by volume of a 10% soda lye and 12 parts of p-chlorobenzylchloride. The whole is stirred at 90–100° C. until no free amino group is present, which is the case after about 5 hours. Then there is distilled with steam. The condensation product is precipitated from the residual solution as a tough resin by addition of sodium chloride. It is separated off and after drying is a light colored powder, very soluble in water.

*Example 2*

18.5 parts of 4 - amino - 4'-amyl-1,1'-diphenylether-2-sulphonic acid, obtained by condensation of amylphenol with p - chloronitrobenzenesulphonic acid and subsequent reduction, are dissolved in 150 parts of water and the necessary amount of caustic soda lye, 20 parts of 2,3,4,6-tetrachlorobenzylchloride are added, the whole is boiled for about 24 hours until no free aminosulphonic acid is detectable. The resulting acid is from time to time neutralized with sodium carbonate. The condensation product precipitates in an oily condition and is separated off and dried.

By condensing 4-nitro-1,2-dichlorobenzene with 2-chloro-4-amylphenol, reduction of the nitro compound and subsequent sulphonation according to Example 1, and condensing the so obtained amino compound with 2,3,4,6-tetrachloro-benzylchloride a very similar product is obtained.

Instead of the 4-amino-4'-amyl-1,1'-diphenylether-2-sulphonic acid other alkylated diphenylethersulphonic acids may be used, for example 4-amino-2-chloro-4'-amyl-1,1-diphenylether-2'-sulphonic acid, 2-amino-4'-chloro-3'-methyl-6'-isopropyl-1,1'-diphenylether-4-sulphonic acid, 2-amino-4'-amyl-6'-chloro-1,1'-diphenylether-4-sulphonic acid, 2-amino-4-chloro-4'-amyl-1,1'-diphenylether-2'-sulphonic acid, 2-amino-4-chloro-4'-tert.-butyl-1,1'-diphenylether-2'-sulphonic acid, 2-amino-4-chloro-4'-isohexyl-1,1'-diphenylether-2'-sulphonic acid, 2-amino-4-chloro-4'-isohexyl-6'-methyl-1,1'-diphenylether-2'-sulphonic acid, 2-amino-4-chloro-4'-isooctyl-1,1'-diphenylether-2'-sulphonic acid, 2-amino-4,6'-dichloro-4'-amyl-1,1'-diphenylether-2'-sulphonic acid or 4-amino-2,6'-dichloro-4'-amyl-1,1'-diphenylether-2'-sulphonic acid. These compounds can also be made according to the above mentioned process.

It is also possible to aralkylate 4-amino-2,2'-dichloro-4'-amyl-1,1,'diphenylether-6'-sulphonic acid with 2,3,4,6-tetrachlorobenzylchloride, to produce the halogen-substituted aminoarylsulphonic acid of the formula

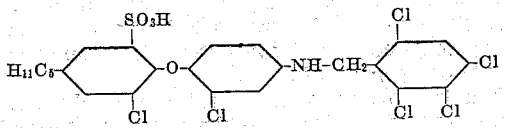

Example 3

20 parts of 2-amino-4,4'-dichloro-1,1'-diphenyl-ether-2'-sulphonic acid (made by smooth sulphonation of 2-amino-4,4'-trichloro-1,1'-diphenylether) are dissolved with 12 parts of chloroacetic acid-3,4-dichloroanilide in 100 parts by volume of hot alcohol and mixed with 5 parts of calcinated soda. The whole is boiled under reflux with stirring during 15 hours, then diluted with 300 parts of water and the separated product filtered off. It is dissolved in hot water, freed from a little insoluble matter by filtering hot and cooled, whereby the condensation product separates; it is dried in a vacuum, giving a light colored powder, soluble in hot water.

The resulting product has in salt form the following formula:

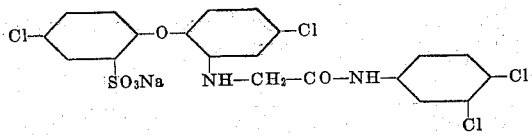

Instead of the chloroacetic acid-3,4-dichloroanilide other amides of the chloroacetic acid can be employed, for instance the 4-chloroanilide, 2,4-dichloroanilide, 4-chlorobenzylamide etc.

Instead of 2-amino-4,4'-dichloro-1,1'-diphenylether-2'-sulphonic acid there may be used 4-amino-4',5-dichloro-1,1'-diphenylsulphide-2-sulphonic acid, 2-amino-4',5'-dichloro-1,1'-diphenylsulphide-4-sulphonic acid, 2-amino-4'-chloro-1,1'-diphenylsulphide-4-sulphonic acid, 4-amino-3',6'-dichloro-1,1'-diphenylsulphide-2-sulphonic acid, 2-amino-3',6'-dichloro-1,1'-diphenylsulphide-4-sulphonic acid, 4-amino-4'-bromo-1,1'-diphenylsulphide-2-sulphonic acid, 2-amino-4'-bromo-1,1'-diphenylsulphide-4-sulphonic acid, 4-amino-5'-chloro-6'-methyl-1,1'-diphenylsulphide-2-sulphonic acid, 4-amino-3'-chloro-6'-methoxy-1,1'-diphenylsulphide-2-sulphonic acid, 4-amino-3',4',6'-trichloro-1,1'-diphenylsulphide-2-sulphonic acid, 2-amino-3',4',6'-trichloro-1,1'-diphenylsulphide-4-sulphonic acid, 4-amino-2',4'-dichloro-1,1'-diphenylsulphide-2-sulphonic acid or 2-amino-2',4'-dichloro-1,1'-diphenylsulphide-4-sulphonic acid. These compounds can also be made by the above mentioned method.

The product made by condensation of 4-amino-4'-chloro-1,1'-diphenylsulphide-2-sulphonic acid with 2,4,6-trichlorobenzyl chloride according to this example is a readily soluble powder of similar properties.

Example 4

10 parts of 4-amino-4'-chloro-5'-methyl-1,1'-diphenylether-2-sulphonic acid are suspended in 100 parts by volume of benzene, 8 parts of chloromethyl-dodecylether are added and the whole is boiled. The resulting acid is gradually neutralized with 5 parts of potassium carbonate. When a test shows no free amine, the precipitated product is isolated and dried in a vacuum.

Instead of the chloromethyl-dodecylether there may be used the chloromethyldodecylthioether.

Example 5

25.4 parts of 4-amino-4',5'-dichloro-1,1'-diphenylether, made by condensation of 4,5-dichlorophenol with 4-chloronitrobenzene and subsequent reduction, are heated with 27 parts of dodecylbromide (or equimolecular parts of decyl- or myristylbromide) during 3 hours to 160–170° C., then for a further 15 hours to 170–180° C., until no more hydrobromic acid escapes and a test shows no free amine. The cold melt is directly sulphonated. It is dissolved in 400 parts of sulphuric acid monohydrate and heated to 90° C. until a test is soluble to a clear solution in sodium carbonate. As soon as this is the case the mass is poured on ice, some resin filtered off, the solution treated with animal charcoal, filtered, and salted out. The sulphonic acid salts are obtained by neutralization.

The sulphonic acid may be acylated by treatment with propionic or butyric acid anhydride; a similar compound is obtained by acylating the unsulphonated compound and sulphonating afterwards.

Instead of the 4-amino-4',5'-dichloro-1,1'-diphenylether there may also be used other unsulphonated compounds, for example 4-amino-4'-chloro-1,1'-diphenylether, 4-amino-4'-chloro-5'-methyl-1,1'-diphenylether, 4-amino-2,4'-dichloro-1,1'-diphenylether, 2-amino-4,4'-dichloro-5'-methyl-1,1'-diphenylether, 4-amino-2,4'-dichloro-5'-methyl-1,1'-diphenylether, 2-amino-4,4',5'-trichloro-1,1'-diphenylether, 4-amino-2,4',5'-trichloro-1,1'-diphenylether, 2-amino-4,2'-dichloro-1,1'-diphenylether, 4-amino-4',6'-dichloro-1,1'-diphenylether, 2-amino-4,4',6'-trichloro-1,1'-diphenylether, 2-amino-4',6'-dichloro-1,1'-diphenylether, 2-amino-4,4',5-trichloro-1,1'-diphenylether, 2-amino-4,4',5'-trichloro-5'-methyl-1,1'-diphenylether, 2-amino-4,4',5-trichloro-1,1'-diphenylether, 2-amino-4-chloro-4'-amyl-1,1'-diphenylether or 4-amino-2-chloro-4'-amyl-1,1'-diphenylether. In each case the sulphonation can be performed before or after the alkylation.

Example 6

19.5 parts of 2-amino-2',4',5'-trichloro-1,1'-diphenylether-4-sulphonic acid are dissolved in 150 parts of water with the necessary quantity of sodium carbonate, 8 parts of p-chlorobenzylchloride are added and the whole is heated to 70–80° C. until no free amino group is detectable. The hydrochloric acid formed is from time to time neutralized with diluted caustic soda lye. The separated resin is filtered off and dried in a vacuum. 10 parts of this condensation product are armed on a water bath for 2 hours with 50 parts by volume of acetic acid anhydride, then the whole is poured into water and after decomposing the excess of anhydride filtered off, washed with a sodium chloride solution and dried in a vacuum.

Similar compounds are obtained with tetrachlorobenzylchloride instead of the monohalogen compound and by using acetic, propionic or butyric acid anhydride as acylating agents.

Instead of the 2-amino-2',4',5'-trichloro-1,1'-diphenylether-4-sulphonic acid also the 4-amino-4'-amyl-6'-chloro-1,1'-diphenylether-2-sulphonic acid, 4-amino-2',4',5'-trichloro-1,1'-diphenylether-2-sulphonic acid, 2-amino-4',5-dichloro-1,1'-diphenylether-4-sulphonic acid, 2-amino-4',5'-dichloro-5'-methyl- 1,1' - diphenylether - 4 - sulphonic acid, 4-amino-2'-chloro-1,1'-diphenylether-2-sulphonic acid, 4-amino-4,6'-dichloro-1,1'-diphenylether-2-sulphonic acid, 2-amino-4',6'-dichloro - 1,1'- diphenylether - 4 - sulphonic acid, 4-amino-4'-chloro-1,1'-diphenylether-2-sulphonic acid, 2-amino-4'-chloro-1,1'-diphenylether-4-sulphonic acid, 2-amino-4'-chloro-5'-methyl-1,1'-diphenylether-4-sulphonic acid, 4-amino-4',5'-dichloro-1,1'-diphenylether - 2 - sulphonic acid, 4-amino-4'-chloro-3',5'-dimethyl-1,1'-diphenylether-2-sulphonic acid, 2-amino-4'-chloro-3',5'-dimethyl - 1,1'- diphenylether-4-sulphonic acid, 4-amino-4'-chloro-3'-methyl-6'-isopropyl-1,1'-diphenylether-2-sulphonic acid, 2-amino-4'-chloro-3'-methyl-6'-isopropyl-1,1'-diphenylether-4-sulphonic acid, 2-amino-3',6'-dichloro-1,1'-diphenylether-4-sulphonic acid, 4-amino-3',6'-dichloro-1,1'-diphenylether - 2 - sulphonic acid, or the 2-amino-4'-amyl-6'-chloro-1,1'-diphenylether-4-sulphonic acid may be used. These diphenylether sulphonic acids are obtained according to known processes by condensing o- or p-chloronitrobenzene sulphonic acids with the corresponding phenols and subsequent reduction.

Also the sulphonated compounds of the list of Example 5 may be used as well. In addition are also available for instance 4-amino-4',5'-dichloro-1,1'-diphenylamine-2-sulphonic acid, 4-amino - 4'-chloro-1,1'-diphenylsulphone- or -sulphoxide-2-sulphonic acid, made by reacting sodium 4-chlorophenylsulphonate with sodium 4-nitrochlorobenzene-2-sulphonate or by reacting 4-chlorothiophenol with sodium 4-nitrochlorobenzene-2-sulphonate and oxidizing with $H_2O_2$, the unoxidized thioether itself, 2-amino-4,4'-dichloro-1,1'-diphenyl-urea-2'-sulphonic acid, 4-chloro-4'-aminodiphenylketone-3-sulphonic acid.

*Example 7*

60 parts of 2-amino-3'-methyl-1,1'-diphenylether-4-sulphonic acid are dissolved in 300 parts by volume of water and the necessary quantity of sodium carbonate. Then 30 parts of benzylchloride are added and the mixture is heated to 50–60° C. until free amino acid is no more detectable. The resulting acid is from time to time neutralized with caustic soda lye. Thereupon the excess of benzylchloride is distilled off by steam, the mass is separated by filtering from some impurities and the filtrate salted-out. The benzylderivative is a brownish mass.

*Example 8*

72 parts of the benzylderivative according to Example 7 are well comminuted, intermixed with 400 parts by volume of acetic acid anhydride and heated to boiling for 6 hours on the reflux apparatus. Then the reaction mass is poured into water to destroy the unaltered acetic acid anhydride, the precipitated acetylderivative is removed by suction and dried. It constitutes a grey powder.

15 parts of the said acetylderivative are dissolved in 300 parts by volume of water and chlorine is slowly passed therethrough at ordinary temperature. After about 2 hours there is neutralized with a sodium carbonate solution and salted out, whereby the chlorinated product precipitates out as semi-solid mass.

But it is also possible to brominate as follows:

30 parts of the above halogen-free acetylderivative are dissolved in 600 parts by volume of water and 12 parts of bromine are then dropped in at ordinary temperature; after stirring for 2 hours there is neutralized with a sodium carbonate solution and the product is salted-out. The brominated product precipitates out as semi-solid mass, which solidifies after some time.

Instead of the above mentioned aminoarylsulphonic acid derivatives there may be used also the numerous other compounds listed in the description and the Examples 1–8 and also their basic compounds containing fewer halogen atoms or no halogen at all.

The improved products can f. i. be used for the treatment of textiles to render them moth-proof. Such treatment can be carried out as follows:

(a) Wool or wool containing fabrics are treated at boiling temperature for 45 minutes to 1 hour with a solution of 0.3 to 0.6% of one of the compounds according to Examples 1 to 8 (calculated on wool), 3 to 5% of sulphuric acid and 10% of crystalline Glauber's salt, then the goods are rinsed and dried, or (b) Wool is treated at 60° C. for 45 minutes with a solution of 0.3 to 0.6% of the above mentioned compounds and 10 to 20% of crystalline Glauber's salt, then it is rinsed and dried.

What we claim is:

1. A process for the manufacture of a halogen substituted aminoarylsulphonic acid, comprising aralkylating 4-amino - 4'- amyl - 1,1'- diphenylether-2-sulphonic acid by reacting the same with 2,3,4,6-tetrachlorobenzylchloride.

2. The halogen substituted amino-arylsulphonic acid of the formula

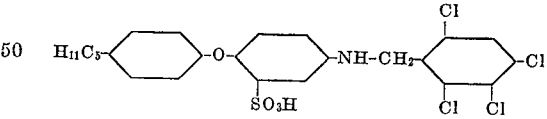

HENRY MARTIN.
HANS HEINRICH ZAESLIN.
RUDOLF HIRT.
ALFRED STAUB.

REFERENCES CITED

The following references are of record in the file of this patent:

UNITED STATES PATENTS

| Number | Name | Date |
|---|---|---|
| 1,012,853 | Holste | Dec. 26, 1911 |
| 1,766,952 | Saunders | June 24, 1930 |
| 1,841,636 | Saunders | Jan. 19, 1932 |
| 1,917,441 | Fischer | July 11, 1933 |
| 2,022,889 | Lauer | Dec. 3, 1935 |
| 2,158,407 | Conzetti | May 16, 1939 |
| 1,898,457 | Muth | Feb. 21, 1933 |

FOREIGN PATENTS

| Number | Country | Date |
|---|---|---|
| 333,559 | Great Britain | 1930 |